United States Patent [19]

Martin et al.

[11] Patent Number: 4,516,594

[45] Date of Patent: May 14, 1985

[54] MULTI-PART VALVE WITH A VALVE SEAT SKELETON AND CAST VALVE BODY

[75] Inventors: John C. Martin; Paul H. Martin, both of Toronto, Canada

[73] Assignee: Diesel Equipment Limited, Toronto, Canada

[21] Appl. No.: 596,311

[22] Filed: Apr. 3, 1984

[51] Int. Cl.³ .................. F16K 27/00; B22D 19/00
[52] U.S. Cl. ...................... 137/15; 137/877; 251/359; 251/366; 29/460; 29/157.1 R
[58] Field of Search ............... 137/15, 315, 861, 877, 137/883, 884; 251/359, 366; 29/460, 157.1 R; 164/98

[56] References Cited

U.S. PATENT DOCUMENTS

| | | | |
|---|---|---|---|
| 3,271,845 | 9/1966 | Breher | 137/15 X |
| 3,360,008 | 12/1967 | Popale et al. | 137/594 |
| 3,762,443 | 10/1973 | Sorenson | 251/366 X |

Primary Examiner—A. Michael Chambers
Assistant Examiner—John C. Fox

Attorney, Agent, or Firm—Fetherstonhaugh & Co.

[57] ABSTRACT

A multi-port valve comprises a valve seat skeleton and a valve body of readily castible material cast about the skeleton. The valve seat skeleton comprises a plurality of wear-resistant members each having a wear-resistant operative surface formed thereon. The wear-resistant members are secured to one another to retain the wear-resistant operative surfaces thereof in a predetermined fixed arrangement. The valve body has a plurality of valve passages formed therein, one for each valve port, at least one of said passages opening to expose each wear-resistant operative surface for engagement by a movable valve component mounted in each valve passage to bear against and move relative to each wear-resistant operative surface in use. The valve is manufactured securing a plurality of wear-resistant members to one another to form a valve seat skeleton on which the wear-resistant operative surfaces are arranged in a predetermined fixed relationship, and casting the valve body about said skeleton.

8 Claims, 4 Drawing Figures 4,516,594

MULTI-PART VALVE WITH A VALVE SEAT SKELETON AND CAST VALVE BODY

FIELD OF INVENTION

This invention relates to multi-port valves having valve seats and the like which are subject to wear.

PRIOR ART

Multi-port valves are commonly made from cast iron and wear-resistant metal valve seats are fitted in their appropriate positions within the valve body after casting. The various passages of the valve body are usually machined and threaded after casting to receive a threaded valved seat. The fitting of wear-resistant valve seats in this manner is costly and time consuming and requires sophisticated machinery. I have found that I can substantially reduce the costs involved in manufacturing a multi-port valve by forming a plurality of wear-resistant members into a skeleton having the required valve seat configurations and thereafter casting the valve body about the skeleton. This method substantially reduces the cost involved in manufacturing a multi-port-valve. While this method does not provide a valve in which the valve seat elements may be replaced, I find that in most instances, the requirement for replacement of the wear resistant member is not as important and the requirement for reduced cost in manufacture.

SUMMARY OF INVENTION

According to one aspect of the present invention, a method of forming a valve having a plurality of valve ports formed therein comprises the steps of, securing a plurality of wear-resistant members, each having a wear-resistant operative surface formed thereon, to one another to form a valve seat skeleton on which the wear-resistant operative surfaces are arranged in a predetermined fixed relationship, and casting a valve body of readily castible material about said skeleton to form a valve body having a plurality of valve passages formed therein, at least one of said passages opening to expose each wear-resistant operative surface whereby the wear-resistant operative surface is exposed for engagement by a movable valve component mounted in the valve passage in use.

According to a further aspect of the present invention, a multi-port valve comprises a valve seat skeleton comprising a plurality of wear-resistant members each having a wear-resistant operative surface formed thereon, said wear-resistant members being secured to one another to retain said wear-resistant operative surfaces thereof in a predetermined fixed arrangement, a valve body of readily castable material cast about said skeleton, said valve body having a plurality of valve passages formed therein, at least one of said valve passages opening to expose each wear-resistant operative surface for engagement by a movable valve component mounted in each valve passage to bear against and move relative to each wear-resistant operative surface in use.

PREFERRED EMBODIMENT

The invention will be more clearly understood after reference to the following detailed specification read in conjunction with the drawings wherein.

Figure 1:
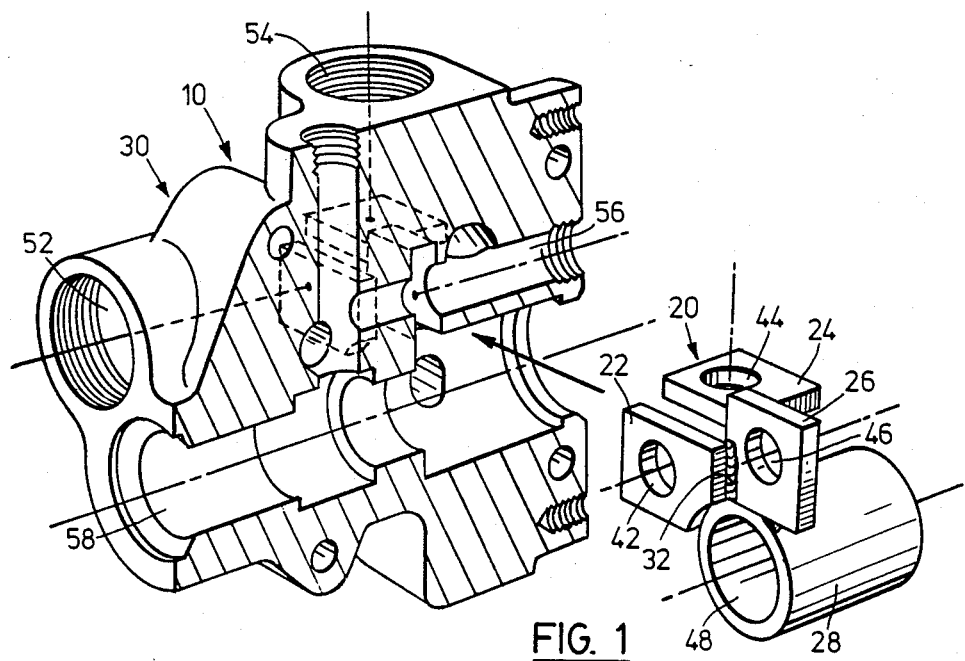
FIG. 1 is a sectional side view of a valve body and a pictorial view of a valve seat skeleton about which the valve body is formed in use.
Figure 3:
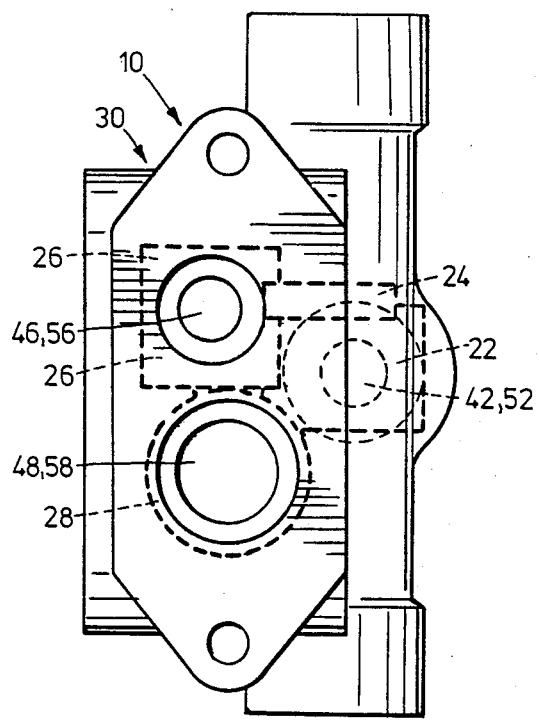
FIG. 3 is an end view of a valve body taken in the direction of the arrow 3—3 of FIG. 1.
Figure 2:
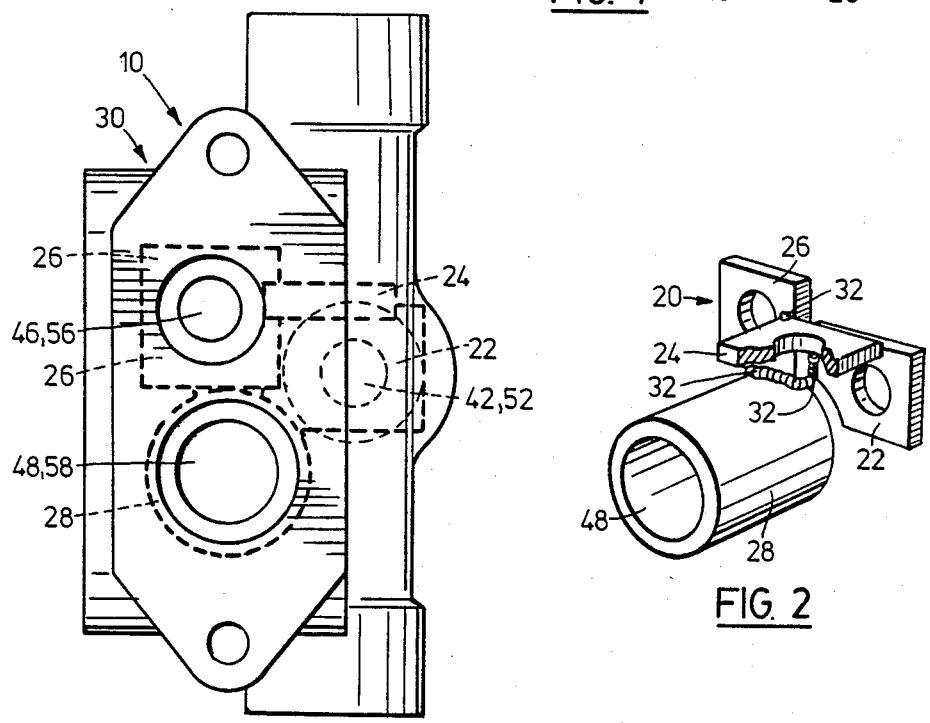
FIG. 2 is a partially sectioned pictorial view of the valve skeleton of FIG. 1 viewed from the opposite end thereof.

With reference to the drawings, the reference numeral 10 refers generally to a valve constructed in accordance with an embodiment of the present invention. The valve 10 comprises a valve seat skeleton 20 and a valve body 30.

The valve seat skeleton 20 comprises wear-resistant valve seat plates 22, 24 and 26 and a wear-resistant sleeve 28. The wear-resistant valve seat plates and sleeve are made from a wear-resistant metal and are secured to one another by welds 32 so as to form a rigid skeleton. The plates 22, 24 and 26 have through passages 42, 44 and 46 respectively and the sleeve 28 has a through passage 48.

The valve body 30 has valve passages 52, 54, 56 and 58 which are aligned with the through passages 42, 44, 46 and 48 of the valve seat skeleton 20 respectively.

Figure 4:
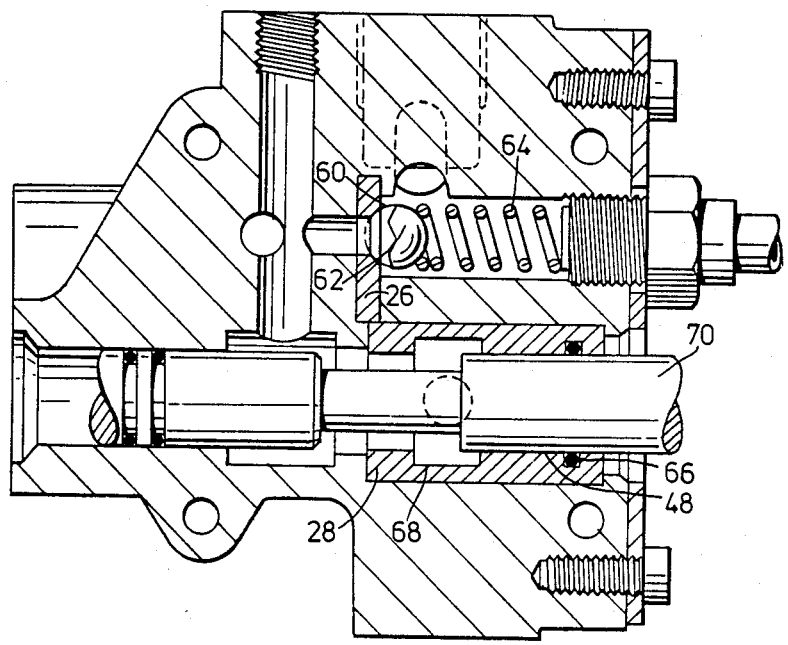
FIG. 4 is a sectional side view of the assembled valve of FIG. 3.

As shown in FIG. 4 of the drawings, a valve seat such as that identified by the reference numeral 60 may be machined in the wear-resistant valve plate 26 to receive a ball valve member 62 which is retained by means of a compression spring 64. Similar valve seats may be machined in each of the wear-resistant valve seat plates 22 and 24. Similarly, the through passage 48 of the sleeve 28 may be machined to accommodate a sealing ring 66 and to provide an annular chamber 68 as required in use. A valve member 70 is slidably mounted in the through passage 48.

Various modifications of the present invention will be apparent to those skilled in the art.

It will be apparent that the valve seat skeleton may have any appropriate number of and arrangement of wear-resistant valve seat plate sleeves and the like arranged to a configuration conforming to the configuration of valve ports and passages to be formed in the valve body.

To manufacture a valve of the type illustrated in FIGS. 1 to 4, the skeleton 1 is initially constructed with the various wear-resistant valve seat plates welded to one another and thereafter, the valve body is cast in a conventional casting process about the skeleton. The valve body may be constructed from readily castible material such as iron, or aluminum which may be die cast and which has the advantage of being of a light weight and is capable of being cast about a wear-resistant steel skeleton without adversely affecting the wear-resistant characteristics of the steel skeleton.

Subsequent to casting, it is only necessary to machine the wear-resistant valve seat plates to accurately align the valve seats and valve passages with the passages which are cast in the valve body.

From the foregoing, it will be apparent that the method of the present invention provides a simple and inexpensive method of manufacturing a valve and the valve structure is such that it is an inexpensive valve.

These and other advantages of the method of the present invention will be apparent to those skilled in the art.

We claim:

1. A multi-port valve comprising:
   (a) a valve seat skeleton comprising a plurality of wear-resistant members each having a wear-resistant operative surface formed thereon, said wear-resistant members being secured to one another to retain said wear-resistant operative surfaces thereof in a predetermined fixed arrangement,
   (b) a valve body of readily castible material cast about said skeleton, said valve body having a plurality of valve passages formed therein, at least one of said valve passages opening to expose each wear-resistant operative surface for engagement by a movable valve component mounted in each valve passage to bear against and move relative to each wear-resistant operative surface in use.

2. A multi-port valve as claimed in claim 1, wherein said wear-resistant operative surfaces are in the form of valve seats.

3. A multi-port valve as claimed in claim 1 wheren at least one of said wear-resistant members in the form of a bush having a cylindrical-shaped wear-resistant operative surface.

4. A multi-port valve as claimed in claim 1 wherein said valve body is formed from castible aluminum.

5. A multi-port valve as claimed in claim 1 wherein said valve body is formed from cast iron.

6. A multi-port valve as claimed in claim 1 wherein said wear-resistant members are made from hardened steel.

7. A multi-port valve as claimed in claim 1 wherein said wear-resistant members are secured to one another by welding.

8. A method of forming a valve having a plurality of valve ports formed therein comprises the steps of, securing a plurality of wear-resistant members, each having a wear-resistant operative surface formed thereon, to one another to form a valve seat skeleton on which the wear-resistant operative surfaces are arranged in a predetermined fixed relationship, and casting a valve body of readily castible material about said skeleton to form a valve body having a plurality of valve passages formed therein, at least one of said passages opening to expose each wear-resistant operative surface whereby the wear-resistant operative surface is exposed for engagement by a movable valve component mounted in the valve passage in use.

* * * * *